United States Patent
Paranthaman et al.

(10) Patent No.: US 9,515,318 B2
(45) Date of Patent: *Dec. 6, 2016

(54) MESOPOROUS METAL OXIDE MICROSPHERE ELECTRODE COMPOSITIONS AND THEIR METHODS OF MAKING

(71) Applicant: UT-Battelle, LLC, Oak Ridge, TN (US)

(72) Inventors: Mariappan Parans Paranthaman, Knoxville, TN (US); Hansan Liu, Wilmington, DE (US); Gilbert M. Brown, Knoxville, TN (US); Xiao-Guang Sun, Knoxville, TN (US); Zhonghe Bi, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 461 days.

This patent is subject to a terminal disclaimer.

(21) Appl. No.: 13/764,060

(22) Filed: Feb. 11, 2013

(65) Prior Publication Data
US 2013/0209897 A1  Aug. 15, 2013

Related U.S. Application Data

(60) Provisional application No. 61/739,894, filed on Dec. 20, 2012, provisional application No. 61/632,430, filed on Feb. 14, 2012.

(51) Int. Cl.
*H01M 4/48* (2010.01)
*C01G 23/04* (2006.01)
(Continued)

(52) U.S. Cl.
CPC ............. *H01M 4/48* (2013.01); *C01G 23/04* (2013.01); *C01G 23/047* (2013.01); *H01M 4/483* (2013.01);
(Continued)

(58) Field of Classification Search
None
See application file for complete search history.

(56) References Cited

U.S. PATENT DOCUMENTS

| | | | |
|---|---|---|---|
| 2004/0234859 A1* | 11/2004 | Lee | H01M 4/364 |
| | | | 429/231.95 |
| 2007/0292760 A1 | 12/2007 | Patoux et al. | |

(Continued)

FOREIGN PATENT DOCUMENTS

| | | |
|---|---|---|
| EP | 2 361 888 A2 | 8/2011 |
| WO | WO 2009/149540 A1 | 12/2009 |

OTHER PUBLICATIONS

Liu et al., Mesoporous TiO2—B Microspheres with Superior Rate Performance for Lithium Ion Batteries, 2011, Adv. Mater., 23, 3450-3454.*

(Continued)

*Primary Examiner* — Patrick Ryan
*Assistant Examiner* — Haixia Zhang
(74) *Attorney, Agent, or Firm* — Brinks Gilson & Lione (57) ABSTRACT

Compositions and methods of making are provided for mesoporous metal oxide microspheres electrodes. The mesoporous metal oxide microsphere compositions comprise (a) microspheres with an average diameter between 200 nanometers (nm) and 10 micrometers (μm); (b) mesopores on the surface and interior of the microspheres, wherein the mesopores have an average diameter between 1 nm and 50 nm and the microspheres have a surface area between 50 m²/g and 500 m²/g. The methods of making comprise forming composite powders. The methods may also comprise refluxing the composite powders in a basic solution to form an etched powder, washing the etched powder with an acid to form a hydrated metal oxide, and heat-treating the hydrated metal oxide to form mesoporous metal oxide microspheres.

25 Claims, 9 Drawing Sheets

(51) Int. Cl.
C01G 23/047 (2006.01)
H01M 10/0525 (2010.01)
H01M 4/02 (2006.01)

(52) U.S. Cl.
CPC ........ C01P 2002/72 (2013.01); C01P 2004/03 (2013.01); C01P 2004/04 (2013.01); C01P 2004/32 (2013.01); C01P 2004/61 (2013.01); C01P 2006/12 (2013.01); C01P 2006/16 (2013.01); H01M 10/0525 (2013.01); H01M 2004/021 (2013.01); Y02T 10/7011 (2013.01)

(56) References Cited

U.S. PATENT DOCUMENTS

| | | |
|---|---|---|
| 2011/0052993 A1 | 3/2011 | Hoshina et al. |
| 2011/0127462 A1 | 6/2011 | Choi et al. |
| 2011/0269025 A1 | 11/2011 | Sun et al. |

OTHER PUBLICATIONS

Armstrong, A. Robert et al., "Lithium-Ion Intercalation into $TiO_2$-B Nanowires," Adv. Mater., vol. 17, No. 7, 2005, pp. 862-865.
Armstrong, A. Robert et al., "$TiO_2$-B Nanowires," Angew. Chem. Int. Ed., vol. 43, 2004, pp. 2286-2288.
Armstrong, Graham et al., "Nanotubes with the $TiO_2$-B Structure," Chem. Commun., 2005, pp. 2454-2456.
Armstrong, Graham et al., "$TiO_2$(B) Nanotubes as Negative Electrodes for Rechargeable Lithium Batteries," Electrochemical and Solid-State Letters, vol. 9, No. 3, 2006, pp. A139-A143.
Arrouvel, Corinne et al., "Lithium Insertion and Transport in the $TiO_2$-B Anode Material: A Computational Study," Chem. Mater., vol. 21, 2009, pp. 4778-4783.
Bavykin, Dmitry V. et al., "Protonated Titanates and $TiO_2$ Nanostructured Materials: Synthesis, Properties, and Applications," Adv. Mater., vol. 18, 2006, pp. 2807-2824.
Beuvier, Thomas et al., "Accurate Methods for Quantifying the Relative Ratio of Anatase and $TiO_2$(B) Nanoparticles," J. Phys. Chem. C, vol. 113, 2009, pp. 13703-13706.
Beuvier, Thomas et al., "$TiO_2$(B) Nanoribbons as Negative Electrode Material for Lithium Ion Batteries with High Rate Performance," Inorg. Chem., vol. 49, No. 18, 2010, pp. 8457-8464.
Bruce, Peter G. et al., "Nanomaterials for Rechargeable Lithium Batteries," Angew. Chem. Int. Ed., vol. 47, 2008, pp. 2930-2946.
Cao, Fei-Fei et al., "Facile Synthesis of Mesoporous $TiO_2$-C Nanosphere as an Improved Anode Material for Superior High Rate 1.5 V Rechargeable Li Ion Batteries Containing LiFePO4-C Cathode," J. Phys. Chem. C, vol. 114, 2010, pp. 10308-10313.
Chadda, S. et al., "Synthesis of $YBa_2Cu_3O_{7-Y}$ and $YBa_2Cu_4O_8$ by Aerosol Decomposition," J. of Aerosol Science, vol. 22, No. 5, 1991, pp. 601-616.
Das, Shyamal K. et al., "High Lithium Storage in Micrometre Sized Mesoporous Spherical Self-Assembly of Anatase Titania Nanospheres and Carbon†," J. Mater. Chem., vol. 20, 2010, pp. 1600-1606.
Feist, Thomas P. et al., "The Soft Chemical Synthesis of $TiO_2$ (B) from Layered Titanates," Journal of Solid State Chemistry, vol. 101, 1992, pp. 275-295.
Guo, Yu-Guo et al., "Superior Electrode Performance of Nanostructured Mesoporous $TiO_2$ (Anatase) through Efficient Hierarchical Mixed Conducting Networks," Adv. Mater., vol. 19, 2007, pp. 2087-2091.
Guo, Yu-Guo et al., "Synthesis of Hierarchically Mesoporous Anatase Spheres and Their Application in Lithium Batteries," Chem. Commun., 2006, pp. 2783-2785.
Hu, Yong-Sheng et al., "High Lithium Electroactivity of Nanometer-Sized Rutile $TiO_2$," Adv. Matter., vol. 18, 2006, pp. 1421-1426.

Huang, Bing et al., "Design and Synthesis of High-Rate Micron-Sized, Spherical $LiFePO_4$/C Composites Containing Clusters of Nano/Microspheres," Electrochimica Acta, vol. 55, 2010, pp. 1227-1231.
Ishii, Yosuke et al., "Mesoporous Carbon-Titania Nanocomposites for High-Power Li-Ion Battery Anode Material," Journal of Physics and Chemistry of Solids, vol. 71, 2010, pp. 511-514.
Kang, Byoungwoo et al., "Battery Materials for Ultrafast Charging and Discharging," Nature, vol. 458, 2009, pp. 190-193.
Kim, Jinyoung et al., "Rate Characteristics of Anatase $TiO_2$ Nanotubes and Nanorods for Lithium Battery Anode Materials at Room Temperature," Journal of the Electrochemical Society, vol. 154, No. 6, 2007, pp. A542-A546.
Kogure, Toshihiro et al., "Formation of $TiO_2$(B) Nanocrystallites in Sol-Gel Derived $SiO_2$-$TiO_2$ Film," J. Am. Ceram. Soc., vol. 82, No. 11, 1999, pp. 3248-3250.
Koudriachova, M. V., "Role of the Surface in Li Insertion Into Nanowires of $TiO_2$-B†," Surf. Interface Anal., vol. 42, 2010, pp. 1330-1332.
Liu, Hansan et al., "Ultrasonic Spray Pyrolyzed Iron-Polypyrrole Mesoporous Spheres for Fuel Cell Oxygen Reduction Electrocatalysts," J. Mater. Chem., vol. 19, 2009, pp. 468-470.
Marchand, René et al., "$TiO_2$(B) a New Form of Titanium Dioxide and the Potassium Octatitanate $K_2Ti_8O_{17}$," Mat. Res. Bull., vol. 15, No. 8, 1980, pp. 1129-1133.
Panduwinata, Dwi et al., "A First Principles Investigation of Lithium Intercalation in $TiO_2$-B," J. Mater. Chem., vol. 19, 2009, pp. 3931-3940.
Paranthaman, M., "Formation of Anisotropic Tl-1212, Tl-2212, Tl-1223 and Tl-2223 Particles Using Aerosol Flow Reacted Powders," IEEE Trans. on Appl. Supercond., vol. 5, 1995, pp. 1490-1493.
Ren, Yu et al., "Lithium Intercalation into Mesoporous Anatase with an Ordered 3D Pore Structure," Angew. Chem. Int. Ed., vol. 49, 2010, pp. 2570-2574.
Saravanan, Kuppan et al., "Mesoporous $TiO_2$ with High Packing Density for Superior Lithium Storage," Energy Environ. Sci., vol. 3, 2010, pp. 939-948.
Tarascon, J.-M et al., "Issues and Challenges Facing Rechargeable Lithium Batteries," Nature, vol. 414, 2001, pp. 359-367.
Tournoux, M. et al., "Layered $K_2Ti_4O_9$ and the Open Metastable $TiO_2$(B) Structure," Prog. Solid St. Chem., vol. 17, 1986, pp. 33-52.
Wang, Donghai et al., "Self-Assembled $TiO_2$-Graphene Hybrid Nanostructures for Enhanced Li-Ion Insertion," ACS Nano, vol. 3, No. 4, 2009, pp. 907-914.
Wang, Donghai et al., "Synthesis and Li-Ion Insertion Properties of Highly Crystalline Mesoporous Rutile $TiO_2$," Chem. Mater., vol. 20, 2008, pp. 3435-3442.
Wang, Guoxiu et al., "Mesoporous $LiFePO_4$/C Nanocomposite Cathode Materials for High Power Lithium Ion Batteries with Superior Performance," Adv. Mater., vol. 22, 2010, pp. 4944-4948.
Wang, Kaixue et al., "Mesoporous Titania Nanotubes: Their Preparation and Application as Electrode Materials for Rechargeable Lithium Batteries," Adv. Mater., vol. 19, 2007, pp. 3016-3020.
Wessel, Claas et al., "Ionic-Liquid Synthesis Route of $TiO_2$(B) Nanoparticles for Functionalized Materials," Chem. Eur. J., vol. 17, 2011, pp. 775-779.
Yang, Zhenguo et al., "Nanostructures and Lithium Electrochemical Reactivity of Lithium Titanites and Titanium Oxides: A Review," Journal of Power Sources, vol. 192, 2009, pp. 588-598.
Yue, Wenbo et al., "Syntheses, Li Insertion, and Photoactivity of Mesoporous Crystalline $TiO_2$," Adv. Funct. Mater., vol. 19, 2009, pp. 2826-2833.
Zhao, Liang et al., "Porous $Li_4Ti_5O_{12}$ Coated with N-Doped Carbon from Ionic Liquids for Li-Ion Batteries," Adv. Matter, vol. 23, 2011, pp. 1385-1388.
Zukalová, Markéta et al., "Pseudocapacitive Lithium Storage in $TiO_2$(B)," Chem. Matter, vol. 17, No. 5, 2005, pp. 1248-1255.

* cited by examiner

MESOPOROUS METAL OXIDE MICROSPHERE ELECTRODE COMPOSITIONS AND THEIR METHODS OF MAKING

CROSS REFERENCE TO RELATED APPLICATIONS

The invention claims the benefit of U.S. Provisional Patent Application No. 61/739,894, filed Dec. 20, 2012, and U.S. patent application Ser. No. 13/372,795, filed Feb. 14, 2012, and converted to Provisional Patent Application No. 61/632,430; both of which are hereby incorporated by reference.

STATEMENT OF GOVERNMENT INTEREST

The invention was made with government support under contract number DE-AC05-00OR22725 by the Department of Energy. The Government has certain rights in the invention.

BACKGROUND

Advanced energy storage systems such as lithium-ion batteries are important approaches to mitigate energy shortage and global climate warming issues that the world is currently facing. High power and high energy density are essential to batteries for applications in electric vehicles, stationary energy storage systems for solar and wind energy, as well as smart grids. Because conventional lithium-ion batteries are inadequate to meet these needs, advanced materials with high capacity and fast charge-discharge capability are desirable for next generation lithium-ion batteries. Titanium dioxide ($TiO_2$) and various polymorphs (anatase, rutile, and $TiO_2$-B (bronze)) have been widely investigated as lithium-ion battery anode materials, due to their advantages in terms of cost, safety and rate capability. In particular, the polymorph of $TiO_2$-B has shown a favorable channel structure for lithium mobility, which results in fast charge-discharge capability of a lithium cell. It has been identified that the lithium intercalation in $TiO_2$-B features a pseudo-capacitive process, rather than the solid-state diffusion process observed for anatase and rutile. Theoretical studies have uncovered that this pseudocapacitive behavior originates from the unique sites and energetics of lithium absorption and diffusion in $TiO_2$-B structure. As a result, $TiO_2$-B nanoparticles, nanotubes, nanowires, and nanoribbons have been reported as anode materials with good rate performance for lithium-ion batteries. These nanomaterials displayed attractive battery performance; however, they also have some disadvantages, e.g., poor electronic conduction network due to aggregation of nanopowders, loss of particle connection during cycling, and low packing density.

Mesoporous materials ($LiFePO_4$ and $TiO_2$) with micrometer-sized particles were found to be able to overcome these shortcomings, yet still maintain the advantages of nanomaterials. The properties of mesoporous materials ensure high contact area between electrolyte and electrode, short diffusion distances for Li+ transport, and good accommodation of strain during cycling. The general concern for mesoporous materials is the long transport distance of electrons in micrometer sized particles. Conductive carbon and $RuO_2$ coatings have thus been employed to improve the high rate performance of lithium storage in mesoporous $TiO_2$ materials.

However, even without conductive coatings, mesoporous anatase materials have shown high capacity and good rate performance. It is believed that the sintered nanograins in mesoporous materials could form a facile electronic transport path because of the accumulation of electrons at the grain-grain interface. On the other hand, micrometer sized materials with a spherical morphology are actually the optimal material morphology in conventional electrode fabrication art, because microspheres have high packing density and good particle mobility to form a compact electrode layer. These features are beneficial to attain high volumetric energy and power density as well as uniform electrode layers. Therefore, it is highly desirable to develop a mesoporous electrode material, such as a mesoporous $TiO_2$ electrode that could combine the advantages of the $TiO_2$-B polymorph, mesoporous structure, and spherical morphology, that has a high capacity and fast charge-discharge capabilities. Additionally, it is desirable to develop a simplified and economic approach to form the mesoporous electrode material.

SUMMARY

Compositions and methods of making are disclosed for mesoporous metal oxide microsphere electrodes for use in batteries.

In one embodiment, the electrode for the battery comprises a mesoporous transition metal oxide microsphere composition having microspheres with an average diameter between 200 nanometers (nm) and 10 micrometers (μm). The electrode further comprises mesopores on the surface and interior of the microspheres, wherein the mesopores have an average diameter between 1 nm and 50 nm. In certain embodiments, the surface area of the mesoporous microspheres is between 50 and 500 $m^2/g$. In certain embodiments, the microspheres are comprised of nanograins with average diameters between 1 nm and 20 nm. In some embodiments, the mesopores are substantially uniformly distributed throughout the surface and the interior of the microspheres.

In some embodiments, the metal oxide in the mesoporous metal oxide microsphere composition is a transition metal oxide. For example, the transition metal oxide may be selected from the group consisting of: titanium oxides, vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one embodiment, the metal oxide is a titanium oxide. In some embodiments, the metal oxide comprises at least one polymorph of titanium dioxide having at least 50 wt. % of a $TiO_2$-B polymorph.

In one particular embodiment, the metal oxide in the mesoporous metal oxide microsphere composition comprises at least 80 wt. % $TiO_2$-B, the average diameter of the microspheres is between 1 μm and 2 μm, the average diameter of the mesopores is between 10 nm and 15 nm, and the microspheres are comprised of nanograins with average diameters between 5 nm and 10 nm.

In certain embodiments, the mesoporous metal oxide microsphere electrode is used as an anode in a lithium-ion battery further comprising a cathode and electrolyte, wherein the battery has at least one of the following performance characteristics: (a) at least a 25% higher capacity at a rate of C/10, at least a 40% higher capacity at a rate of 1 C, at least a 100% higher capacity at a rate of 10 C, or at least a 400% higher capacity at a rate of 60 C, when compared with a lithium-ion battery having a $TiO_2$ anatase anode composition; (b) a capacity at least 250 mAh/g at a rate of C/10, a capacity of at least 200 mAh/g at a rate of 1 C, a capacity of at least 150 mAh/g at a rate of 10 C, or a capacity of at least 100 mAh/g at a rate of 60 C; (c) an ability to charge from 0% to 50% of the full range capacity in 6 minutes, or an ability to charge from 0% to 33% of the full range capacity in 1 minute; and (d) a functional discharge capacity of at least 50%, 60%, 70%, 80%, or 90% of the initial discharge capacity after 5000 cycles.

In another embodiment, a battery comprises an anode having mesoporous metal oxide microspheres, wherein the mesoporous metal oxide microspheres comprise (a) microspheres with an average diameter between 200 nm and 10 μm and (b) mesopores on the surface and interior of the microspheres, wherein the mesopores have an average diameter between 1 nm and 50 nm and the microspheres have a surface area between 50 $m^2/g$ and 500 $m^2/g$. The battery further comprises a cathode and an electrolyte capable of supporting reversible deposition and stripping of metal at the anode, and reversible intercalation and deintercalation of the metal at the cathode. In certain embodiments, the mesopores in the mesoporous metal oxide microspheres are substantially uniformly distributed throughout the surface and the interior of the microspheres.

In some embodiments, the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium. In one particular embodiment, the battery is a lithium-ion battery.

In some embodiments, the metal oxide in the anode of the battery is a transition metal oxide. The transition metal oxide may be selected from the group consisting of: titanium oxides, vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one embodiment, the metal oxide is a titanium oxide. In some embodiments, the metal oxide comprises at least one polymorph of titanium dioxide having at least 50 wt. % of a $TiO_2$-B polymorph.

In certain embodiments, the metal oxide in the anode of the battery comprises at least 80 wt. % $TiO_2$-B, the average diameter of the microspheres is between 1 μm and 2 μm, the average diameter of the mesopores is between 10 nm and 15 nm, and the microspheres are comprised of nanograins with average diameters between 5 nm and 10 nm.

In certain embodiments, the battery has at least a 25% higher capacity at a rate of C/10, at least a 40% higher capacity at a rate of 1 C, at least a 100% higher capacity at a rate of 10 C, or at least a 400% higher capacity at a rate of 60 C, when compared with a lithium-ion battery having a $TiO_2$ anatase anode composition. In other embodiments, the battery has at a capacity at least 250 mAh/g at a rate of C/10, a capacity of at least 200 mAh/g at a rate of 1 C, a capacity of at least 150 mAh/g at a rate of 10 C, or a capacity of at least 100 mAh/g at a rate of 60 C. In yet other embodiments, the battery has an ability to charge from 0% to 50% of the full range capacity in 6 minutes, or an ability to charge from 0% to 33% of the full range capacity in 1 minute. In one particular embodiment, the battery of has a functional discharge capacity of at least 90% of the initial discharge capacity after 5000 cycles.

In some embodiments, the battery is used in a grid storage application, vehicle battery application, military application, portable electronic device application, medical device application, or standard cell size battery application.

In certain embodiments, a method of making a mesoporous metal oxide microsphere electrode comprises providing a metal-silica composite powder. The method further comprises refluxing the composite powder in a sodium hydroxide solution to form an etched powder. The method further comprises washing the etched powder with an acid to form a hydrated metal oxide. The method further comprises heat-treating the hydrated metal oxide to form mesoporous metal oxide microspheres.

In some embodiments, the metal-silica composite powder is formed by a process selected from the group consisting of: aerosol pyrolysis, spray drying, freeze drying, combustion chemical vapor deposition, and plasma processing. In one embodiment, the metal-silica composite powder is formed by aerosol pyrolysis. In certain embodiments, the metal in the metal-silica composite powder comprises titanium. In some embodiments, the metal oxide is a transition metal oxide. In one embodiment, the metal oxide is $TiO_2$-B.

In other embodiments, the metal-silica composite powder is formed by providing colloidal silica and metal oxides. The method further comprises mixing the silica and metal oxides to form a mixed solution. The method further comprises nebulizing the mixed solution to form a nebulized mixed solution. The method further comprises heating the nebulized mixed solution at an elevated temperature to form a composite powder. In some embodiments, the metal oxide is a transition metal oxide. In one particular embodiment, the metal oxide is $TiO_2$-B.

In certain embodiments, a method of making a mesoporous metal oxide microsphere electrode comprises providing a metal precursor, wherein the metal precursor contains less than 0.1 wt % of a silica precursor. The method further comprises forming a mesoporous metal oxide microsphere powder by treating the metal precursor by a process selected from the group consisting of: aerosol pyrolysis, spray drying, freeze drying, combustion chemical vapor deposition, and plasma processing. In some embodiments, the mesoporous metal oxide microsphere powder is formed by aerosol pyrolysis. In other embodiments, the metal precursor is a titanium precursor selected from the group consisting of: titanium nitrate, titanium chloride, titanium ethoxide, titanium alkoxide, titanium acetylacetonates, and combinations thereof. In yet other embodiments, the metal oxide in the mesoporous metal oxide microspheres is a transition metal oxide. In one embodiment, the metal oxide is $TiO_2$.

BRIEF DESCRIPTION OF THE DRAWINGS

The denotations of S1, S2, and A represent the CV peaks of pseudocapacitive behavior and solid-state diffusion, respectively.

DETAILED DESCRIPTION

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "lithium-ion" may refer to any ion comprising lithium, including but not limited to $Li^+$.

As used herein, the term "cycle" may refer to the discharge and charge of the capacity of the battery.

As used herein, the term "functional discharge capacity" may refer to a comparison between the current capacity of the battery versus the battery's initial capacity. In certain embodiments, the battery is still operable when the functional discharge capacity is more than 50%, 60%, 70%, 80%, or 90% of the initial discharge capacity.

As used herein, the terms "secondary" and "secondary battery" may refer to rechargeable batteries wherein the electrochemical reactions are electrically reversible (i.e., the reaction can be reversed by running a current into the cell to restore the capacity of the battery). In certain embodiments, the secondary battery can achieve a number of cycles (e.g., 100, 1000, 5000, or 10000 cycles) while maintaining a functional discharge capacity (e.g., the discharge capacity is more than 50%, 60%, 70%, 80%, or 90% of the initial discharge capacity).

As used herein, the terms "mesoporous" and "mesoporous structure" may refer to a material or composition containing pores. In certain embodiments, the average pore size of the microsphere structure is between 1 nanometer (nm) and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

As used herein, the term "$TiO_2$-B" may refer to the monoclinic crystal system structure of $TiO_2$. In some embodiments, $TiO_2$-B is synthesized through the hydrolysis of $K_2Ti_4O_9$ followed by heating.

As used here, the terms "C/10," "C/2," "1 C," "2 C," "5 C," "10 C," "20 C," "30 C," "60 C," and the like refer to the "C-rate" or capacity rating (Amp-hour) of the battery.

It has been discovered that mesoporous metal oxide microsphere electrode compositions are capable of improved capacity, faster charge-discharge capabilities, and longer lifetimes in comparison to the current battery technology. In certain embodiments, batteries with mesoporous metal oxide microsphere electrode compositions may be used in grid storage applications, vehicle battery applications, military applications, portable electronic device applications, medical device applications, or standard cell size battery applications. In one particular embodiment, a battery with a mesoporous metal oxide microsphere electrode composition is used for a grid storage application. In another particular embodiment, the battery is used in a vehicle battery application. In yet another particular embodiment, the battery is used in a portable electronic device application.

In certain embodiments, the improved battery comprises: (1) an anode having a mesoporous metal oxide microsphere composition, (2) a cathode, and (3) an electrolyte capable of supporting reversible deposition and stripping of metal at the anode, and reversible intercalation and deintercalation of the metal at the cathode.

In certain embodiments, the mesoporous metal oxide microsphere composition is used as an electrode in one of the following types of batteries: lithium-ion battery, aluminum-ion battery, magnesium-ion battery, sodium-ion battery, metal-air (wherein the metal is lithium, aluminum, magnesium, zinc, or sodium) battery, and metal-sulfur (wherein the metal is lithium, aluminum, magnesium, zinc, or sodium) battery. In one particular embodiment, the mesoporous metal oxide microsphere composition is an electrode in a lithium-ion battery.

Anode

In certain embodiments, the anode composition comprises metal oxide microspheres with a spherical morphology and mesopores. As prepared, the spherical metal oxide microspheres typically comprise a size distribution having a unimodal peak or average particle size. In some embodiments, the average microsphere diameter is between 200 nanometers (nm) and 10 micrometers (μm). In other embodiments, the average metal oxide microsphere diameter is between 500 nm and 5 μm. In yet other embodiments, the average microsphere diameter is between 1 μm and 2 μm. In one particular embodiment, the average microsphere diameter is approximately 1 μm.

In certain embodiments, the mesopores in the microsphere structure have an average pore diameter between 1 nm and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

In certain embodiments, the microspheres in the mesoporous metal oxide microsphere structure are comprised of nanocrystallites or nanograins having an average grain diameter between 1 nm and 20 nm. In another embodiment, the average grain diameter of the nanocrystallites is between 5 nm and 10 nm. In one particular embodiment, the average grain diameter is approximately 6 nm.

With regard to the location of the mesopores in the microsphere structure, in certain embodiments, the pore sites are substantially uniformly distributed throughout the microsphere structure (i.e., on the surface and throughout the interior of the spherical microspheres).

In certain embodiments, the mesoporous metal oxide microsphere structure has a surface area between 50 $m^2/g$ and 500 m²/g. In another embodiment, the surface area is between 100 m²/g and 300 m²/g. In another embodiment, the surface area of the mesoporous metal oxide microsphere structure is between 100 m²/g and 200 m²/g.

In certain embodiments, the metal oxide in the mesoporous microsphere composition is a transition metal oxide. In certain embodiments, the transition metal oxide is selected from the group consisting of titanium oxides (e.g., titanium dioxide and its polymorphs), vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide is a titanium oxide. In another embodiment, the metal oxide is a nickel oxide.

In certain embodiments, the mesoporous microsphere composition is a titanium oxide selected from the following titanium dioxide polymorphs consisting of rutile, anatase, brookite, $TiO_2$-H (Hollandite-like), $TiO_2$-R (Ramsdellite-like), $TiO_2$-II ($\alpha$-$PbO_2$-like), $TiO_2$-OI, $TiO_2$-II (Cotunnite-like), $TiO_2$-B, and combinations thereof. In one particular embodiment, the mesoporous microsphere composition comprises the $TiO_2$-B polymorph. As discussed above, the $TiO_2$-B polymorph may be synthesized through the hydrolysis of $K_2Ti_4O_9$ followed by heating; the $TiO_2$-H polymorph may be synthesized by oxidation of related potassium titanate bronzes: $K_{0.25}TiO_2$; and the $TiO_2$-R polymorph may be synthesized by oxidation of related lithium titanate bronzes: $Li_{0.5}TiO_2$.

In some embodiments, the mesoporous microsphere composition comprises a material composition having more than 50 wt. % of the $TiO_2$-B polymorph (i.e., the majority phase of the mesoporous microsphere composition is the $TiO_2$-B phase). In other embodiments, the mesoporous microsphere comprises a material composition having more than 60 wt. %, 70 wt. %, 80 wt. %, or 90 wt. % of the $TiO_2$-B polymorph. In some embodiments, the remaining percentage of the mesoporous microsphere composition is primarily comprised of the rutile and/or anatase polymorph. In some embodiments, the mesoporous microsphere comprises a material composition of approximately 100 wt. % of the $TiO_2$-B polymorph.

Cathode

In certain embodiments, the cathode comprises a material capable of intercalating the metal ions during a discharge cycle and deintercalating the metal ions during a charge cycle. In certain embodiments, the cathode is a "high-rate" or "high current rate" cathode capable of a fast charge and discharge capacity.

In certain embodiments, the cathode comprises an active material selected from the group consisting of one or more phases: $LiCoO_2$, $LiMn_2O_4$, $Li_2MnO_3$, $LiNiO_2$, $Li(Mn_{1.5}Ni_{0.5})O_4$, $LiFePO_4$, $Li_2FePO_4F$, $Li_3CoNiMnO_6$, and $Li(Li_aNi_xMn_yCo_z)O_2$. In one particular embodiment, the cathode comprises $LiFePO_4$.

In other embodiments, the cathode is selected from the group consisting of: $\lambda$-$MnO_2$ (or $\lambda$-$Mn_2O_4$) and $V_2O_5$ In some embodiments, the cathode is "$LiM_xO_y$," [herein defined as any lithium-ion cathode material comprising a metal (M) and oxide (O)]. Non-limiting examples of $LiM_xO_y$ cathodes include lithium cobalt oxide, lithium iron phosphate, and lithium manganese oxide.

In certain embodiments, these active components can be mixed with a carbon material (such as carbon black, for example) to make them conducting, and mixed with a binder (such as PVDF binder in N-methylpyrrolidinole, for example) to hold the material together.

In other non-limiting examples, Ti(II) and Mn(II) complexes may also be considered as a transition element for the cathode material.

In another embodiment, the cathode material is $\lambda$-$MnO_2$ In certain embodiments, the cathode material can be prepared in a "reduced" or uncharged state by reacting $MnO_2$ with butyllithium for Li-ion batteries. The cathode may then be "charged" by oxidation of the Mn oxide resulting in expulsion of $Li^+$ ions.

Spinel-type $MnO_2$ may be made by treating $LiMn_2O_4$ with aqueous acid. This $\lambda$-$MnO_2$ has the same structural framework of spinel, but with most of the lithium removed from the tetrahedral sites of the spinel lattice. The mechanism for the conversion of $LiMn_2O_4$ to $\lambda$-$MnO_2$ involves a disproportionation of the $Mn^{3+}$ ions into $Mn^{4+}$ (remains in the solid) and $Mn^{2+}$ (leaches out into the aqueous solution).

Electrolyte

Suitable electrolytes for the battery are electrochemically stable compositions within the operation window of the electrodes. In other words, in certain embodiments, a suitable electrolyte is one that is capable of supporting reversible deposition and stripping of metal at the anode, and reversible intercalation and deintercalation of metal at the cathode. Suitable electrolytes may include materials that assist in achieving a wide electrochemical window, good ionic conductivity, improved rate capability, long cycle ability, good capacity retention, and compatibility with the anode and cathode materials.

In certain embodiments, the electrolyte is a metal salt. The metal salt may be dissolved in an organic solvent such as ethylene carbonate, dimethyl carbonate, diethyl carbonate, and combinations thereof. In some embodiments, the battery is a lithium-ion battery and the electrolyte is a lithium salt selected from the group consisting of: $LiPF_6$, $LiBF_4$, and $LiClO_4$.

In certain embodiments, the electrolyte materials may be optimized through the addition of suitable co-solvents that may assist in reducing viscosity (increasing mobility) and/or increasing charge transfer number (increasing salt dissociation).

Performance

In certain embodiments, the battery having an mesoporous metal oxide microsphere electrode has a higher capacity in comparison to a similar metal oxide nanopowder/nanoparticle electrode. For example, where the metal oxide is titanium dioxide, the mesoporous $TiO_2$-B microsphere structure has a higher capacity over a $TiO_2$ (anatase) nanopowder at various rates.

In some embodiments, the mesoporous metal oxide microsphere electrodes (e.g., $TiO_2$-B) have at least a 25% higher capacity (mAh/g) at a rate of C/10, at least a 40% higher capacity at a rate of 1 C, at least a 100% higher capacity at a rate of 10 C, or at least a 400% higher capacity at a rate of 60 C, in comparison with a similar metal oxide nanopowder (e.g., $TiO_2$ anatase).

In other embodiments, the mesoporous metal oxide microsphere electrodes (e.g., $TiO_2$-B) have a capacity (rate performance) of at least 250 mAh/g at a rate of C/10, a capacity of at least 200 mAh/g at a rate of 1 C, a capacity of at least 150 mAh/g at a rate of 10 C, or a capacity of at least 100 mAh/g at a rate of 60 C. In one embodiment, the capacity of the battery comprising the mesoporous metal oxide microsphere electrode is approximately 165 mAh/g at 10 C and approximately 116 mAh/g at 60 C.

In certain embodiments, the battery comprising the mesoporous metal oxide microsphere electrode (e.g., $TiO_2$-B), has an improved charge and discharge rates. In some embodiments, the battery can discharge 50% of the full range capacity in approximately 6 minutes. In other embodiments, the battery can be charged from 0% to 50% of the full range capacity in 6 minutes. In yet other embodiments, the battery can be discharge 33% of the full range capacity in approximately 1 minute. In certain embodiments, the battery can be charged from 0% to 33% of the full range capacity in 1 minute.

In certain embodiments, the battery is a secondary battery capable of having at least 100, 1000, 5000, or 10000 cycles prior to battery failure. In some embodiments, battery failure is related to the functional discharge capacity becoming only 50%, 60%, 70%, 80%, or 90% of the initial discharge capacity after a number of cycles. In other embodiments, battery failure is related to the inability to recharge the battery due to dendrite formation, oxide film formation, or other buildup on the anode or cathode. In one particular embodiment, the battery is capable of having a functional discharge capacity greater than 50% of the initial discharge capacity after 5000 cycles. In another embodiment, the secondary battery is capable of having a functional discharge capacity greater than 90% of the initial discharge capacity after 5000 cycles.

In certain embodiments, the battery comprising the mesoporous metal oxide microsphere electrode is safer than similar batteries comprising carbon/graphite electrodes. Graphite anodes may have several drawbacks where safety is critical. This includes first cycle capacity loss. Since the carbon potential is close to that of Li/Li+ redox level, lithium plating occurs on the carbon anode through a thin passivating Solid-Electrolyte Interphase (SEI) layer and lithium dendrite formation causes safety concerns. Since the redox level is away from the Li/Li+ redox levels for certain oxides such as $TiO_2$ or Lithium titanate ($Li_4Ti_5O_{12}$), the SEI formation is prevented (and no Lithium plating/deposition), which leads to safer batteries. Additionaly, compared to an alternate commercial lithium titanate ($Li_4Ti_5O_{12}$) anode material, $TiO_2$-B boasts a higher capacity in certain embodiments (e.g., approximately 256 mAh/g vs. 165 mAh/g).

Methods of Making

In certain embodiments, methods of making the battery comprise providing an anode comprising a mesoporous metal oxide microsphere composition. In certain embodiments, the methods further comprise providing a high-rate capable cathode. In certain embodiments, the methods further comprise providing an electrolyte capable of supporting reversible deposition and stripping of metal at the anode, and reversible intercalation and deintercalation of the metal at the cathode. In some embodiments, the anode comprises a mesoporous $TiO_2$-B microsphere composition. In other embodiments, the anode comprises a mesoporous $TiO_2$ (anatase) composition.

In certain embodiments, the mesoporous microsphere composition for the anode is formed by providing colloidal silica and the metal oxide. The method may further comprise mixing the silica and metal oxide. The method may further comprise nebulizing the mixed solution into small droplets with an ultrasonic atomizer. The method may further comprise heating the nebulized mixed solution at an elevated temperature (e.g., 600° C.) and then collecting the composite powders in a water bubbling system. The method may further comprise refluxing the powders in a basic solution (e.g., sodium hydroxide solution) in order to etch the silica and sodium ions into the metal oxide structure. The method may further comprise washing the etched powder with an acid (e.g., hydrochloric acid) to remove the silicate residue from the pores and exchange the sodium ions with protons. The method may further comprise heat-treating the hydrated metal oxide at an elevated temperature (e.g., 400-500° C.) in flowing argon gas to form the mesoporous metal oxide microsphere structure.

Specifically, one particular method of formation of a mesoporous $TiO_2$-B microsphere structure is described in the example section below.

Figure 1:
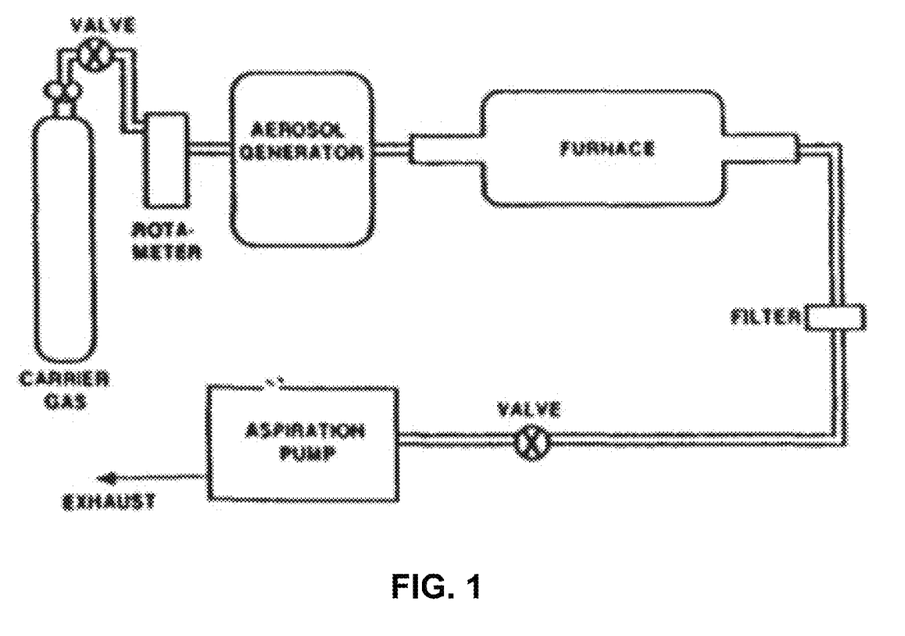
FIG. 1 depicts a schematic diagram of an aerosol pyrolysis system.

In certain embodiments, the mesoporous microsphere composition is prepared by using one of: aerosol pyrolysis, spray drying, freeze drying, or plasma processing. In one embodiment, an aerosol pyrolysis technique, such as shown in FIG. 1, is used to produce a titania-silica powder for the mesoporous microsphere composition. In such a process, the titania template may be combined with a soluble inorganic precursor in water and/or organic solvents to form a solution. Examples of soluble inorganic precursors include nitrates, acetates, sulfates, acetylacetonates, and trifluoroacetates. The solution may enter the aerosol pyrolysis system at the aerosol generator, and may be carried by a carrier gas into a furnace to undergo pyrolysis to form titania or titania-silica composite spheres. In certain embodiments, the titania solution comprises titanium (IV) bis (ammonium lactate) dihydroxide solution, with colloidal silica (30 wt % LUDOX HS-30).

In certain embodiments, the titania precursor solution does contains a negligible amount (e.g., <1 wt %, <0.1 wt %, <0.01 wt %, or 0 wt %) of silica precursor. In one embodiment, the solution contains no silica precursor. For example, the titania solution/precursor may be selected from the group consisting of: titanium nitrate, titanium chloride, titanium ethoxide, titanium alkoxide, titanium acetylacetonates, and combinations thereof.

In some embodiments, the carrier gas may be an inert gas. The carrier gas may comprise nitrogen. In some embodiments, the flow rate of the carrier gas may comprise 0.1-100 L/min, 1-10 L/min, 2-5 L/min, or 3-4 L/min. In some embodiments, the furnace temperature for the pyrolysis reaction may be between 100-700° C. Downstream of the furnace, the aerosol pyrolysis system may have a filter or separation unit to separate the desired titania composite powder from any light ends or fines. The carrier gas may be also be removed through an exhaust stream, and controlled by an aspiration pump and valve, downstream of the filter unit, which may help increase the flow rate and reduce the residence time inside the furnace.

After formation of a metal-silica (e.g., titania-silica) powder, the silica template may be removed by refluxing with a basic solution (e.g., sodium hydroxide) in order to etch the silica and sodium ions into the metal oxide structure. The method may further comprise washing the etched powder with an acid (e.g., hydrochloric acid) to remove the silicate residue from the pores and exchange the sodium ions with protons. The method may further comprise heat-treating the hydrated metal oxide at an elevated temperature (e.g., 400-500° C.) in flowing argon gas to form the mesoporous metal oxide microsphere structure.

In another embodiment, where no silica precursor is combined with the metal precursor, there is no refluxing, washing, or heat-treatment step required. Such procedures may offer a simplified and economic approach to forming the mesoporous microsphere composition without added complexity.

In some embodiments, batteries for grid storage applications may be formed. In other embodiments, batteries for vehicle applications may be formed. In yet other embodiments, batteries for military applications may be formed. In yet other embodiments, batteries for portable electronic devices may be formed. In some embodiments, batteries for medical device applications may be formed. In certain embodiments, batteries for standard cell size battery applications may be formed.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

In this example, mesoporous $TiO_2$-B microspheres were formed and tested in a lithium-ion battery for their performance characteristics.

Example 1

Material Synthesis

A titania-silica composite precursor was prepared by a template assisted ultrasonic spray pyrolysis method. Colloidal silica (30 g, 30 wt. % LUDOX HS-30, Aldrich) was added into titanium (IV) bis(ammonium lactato) dihydroxide solution (200 mL, 0.25 M, Aldrich) under stirring. The mixed solution was nebulized into small droplets by an ultrasonic atomizer (2.4 MHz, Sonaer Ultrasonics). Flowing nitrogen gas carried the droplets through a tube furnace at 600° C. The titania-silica composite powders were then collected in a water bubbling system. The powders were then refluxed in sodium hydroxide solution (100 ml, 8 M, Aldrich) at 100° C. for 3 days, in order to etch silica and insert sodium ions into titania. The sample was washed by hydrochloride acid (1 M) to remove silicate residue from the pores and exchange sodium ions with protons. The hydrated sample ($H_2Ti_2O_5.H_2O$) was then heat-treated at a temperature between 400° C. and 500° C. in a flowing argon gas for an hour to form $H_2Ti_3O_7$ and $TiO_2$-B, respectively.

Material Characterization:

X-ray diffraction (XRD) patterns were collected on a Bruker D5005 diffractometer using Cu K α radiation. Rietveld refinement of XRD pattern was performed using the General Structure Analysis System (GSAS) software. Thermogravimetry-Differential Scanning calorimetry (TG-DSC) was conducted in a temperature range of 25-1000° C. and in an argon flow atmosphere with a Netzsch STA 409 PC thermal analyzer. The particle size distribution was measured using a Malvern Mastersizer 2000 particle size analyzer. Nitrogen adsorption-desorption isotherms were obtained using a TriStar surface area & porosity analyzer at 77 K. The specific surface area was calculated by the Brunauer-Emmett-Teller (BET) method. The pore size distribution was calculated by the Barret-Joyner-Halenda (BJH) method. The microstructural characterizations of mesoporous $TiO_2$-B were performed using a Hitachi HF-3300 S/TEM instrument that was operated at 300 kV.

Electrochemical Evaluation:

The electrodes were fabricated by a conventional coating method. A slurry consisting of the as-synthesized active material (70 wt. %), Super-S carbon black (15 wt. %), and polyvinylidene fluoride (PVDF, 15 wt. %) in N-methyl-2-pyrrolidone (NMP) was uniformly spread onto a Cu foil. The active material loading was 1-2 mg/cm². The electrodes were dried in a vacuum oven at 120° C. overnight before transferring into an Argon-filled glove box (VAC OMNI-LAB). Coin cells (CR2032) were fabricated using lithium metal as the counter electrode, Celgard 2325 as the separator and LiPF6 (1 M) in ethylene carbonate/dimethyl carbonate/diethyl carbonate (EC/DMC/DEC, 1:1:1 vol. %) as the electrolyte. The cells were tested using an Arbin BT2000 charger and a Princeton Applied Research VersaSTAT 4 potentiostat. In order to detect the structure stability of $TiO_2$-B material after cycling, the cycled cell was disassembled to get the electrode. After washed in DMC for three times and dried in vacuum for overnight, the electrode was sent for XRD test.

Figure 2A:
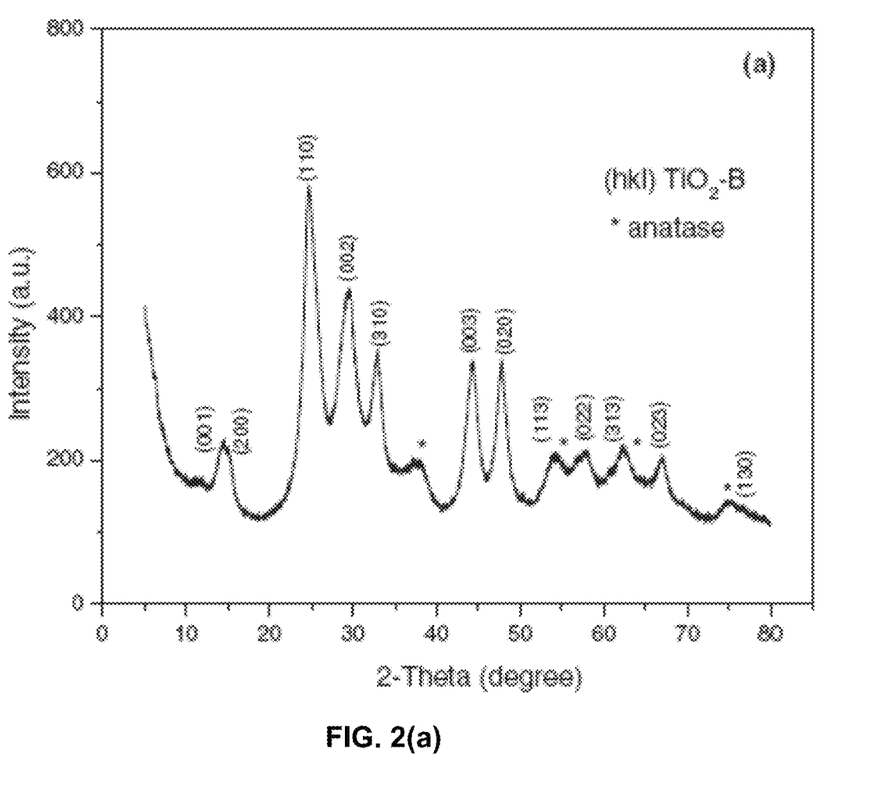
FIG. 2(a) depicts a powder x-ray diffraction (XRD) pattern for the mesoporous $TiO_2$-B microsphere composition of the prepared example.

The evolution of the crystal structure during the synthesis can be observed by thermogravimetry-differential scanning calorimetry (TG-DSC) curves and the XRD patterns of the intermediates. The DSC curve, shown in FIG. 2(a), implies four phase transition regions at various temperature ranges of 150-380° C., 380-500° C., 500-740° C., and 740-1000° C., corresponding to the polymorph evolution of hydrated titanate ($H_2Ti_2O_5.H_2O$), trititanate ($H_2Ti_3O_7$), $TiO_2$-B, and anatase to rutile, respectively. The XRD patterns show that anatase is the original phase in the titania-silica composite material of Example 1; hydrated titanate (ICDD #00-047-0124) and trititanate (ICDD #00-047-0561) are formed subsequently after refluxing and during ion-exchange treatment and calcination at 400° C., as indicated from the appearance of the (002) peak. The small amount of anatase in the final material could originate from the un-reacted initial anatase precursor or the partial transformation of $TiO_2$-B to anatase that occurs during heat treatment, which is similar to that noted in previous reports. In order to quantify the amount of anatase in the $TiO_2$-B material, Rietveld refinement was conducted under a two-phase analysis mode. The result indicates a material composition having 87% of $TiO_2$-B and 13% of anatase, i.e., the majority phase in the materials is $TiO_2$-B. In addition, the broadened peaks in the pattern indicated the presence of nanocrystalline grains in the material. Based on Scherrer equation the average grain size of $TiO_2$-B is estimated to be 6 nm using the FWHM of the (002) peak.

Figure 2B:
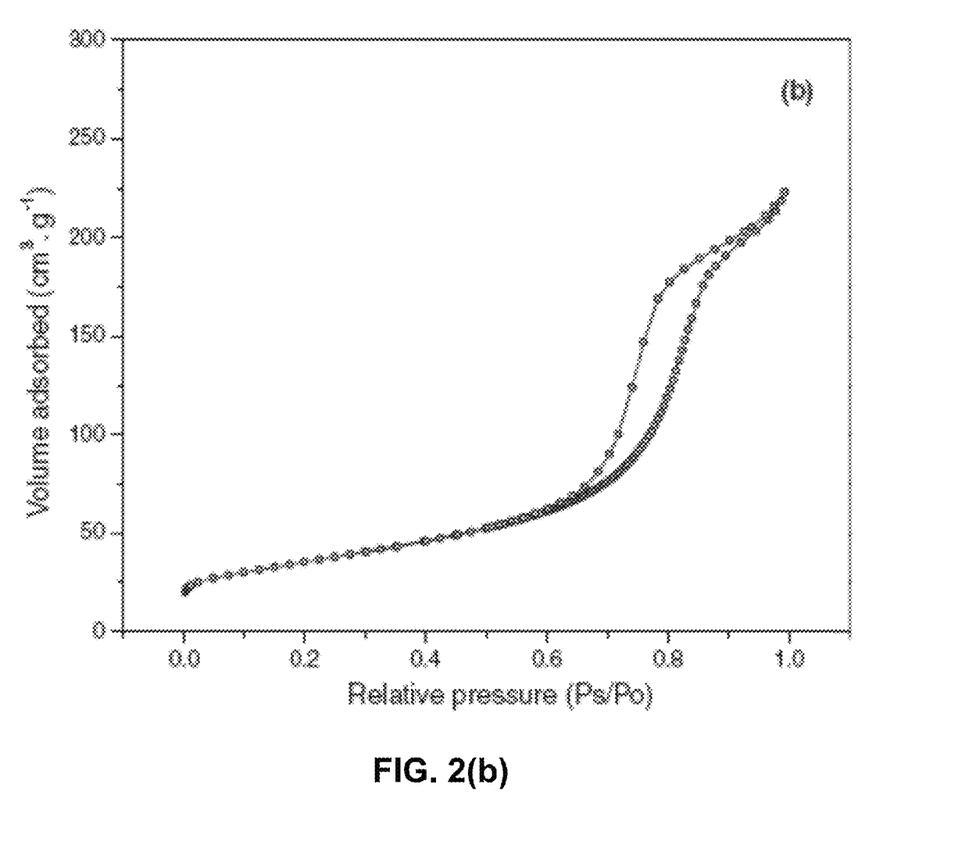
FIG. 2(b) depicts a nitrogen adsorption and desorption isotherm curve of the prepared mesoporous $TiO_2$-B microspheres.

Nitrogen isothermal adsorption-desorption measurements were performed to determine the Brunauer-Emmett-Teller (BET) surface area and the porosity of the prepared materials. FIG. 2(b) shows the isotherm curve of the prepared $TiO_2$-B spheres, which is a typical Type IV isotherm representing a mesoporous structure with a BET specific surface area of 126 m²/g. The pore size distribution comprised a unimodal peak around 12 nm, which is the same as the colloid size of the silica template. Compared with mesoporous $TiO_2$-B material, intermediate phases show higher surface area but smaller pores. The BET surface areas of hydrated titanate and trititanate are 324 m²/g and 243 m²/g, respectively.

After removal of water, the structure transforms to $TiO_2$-B and the pore size resumes the original template size. This phenomenon indirectly validates that this mesoporous structure could have excellent capability to accommodate strain and structure changes during battery cycling. The morphology and microstructure of the as-prepared materials were analyzed by electron microscopy characterization methods.

Figure 3A:
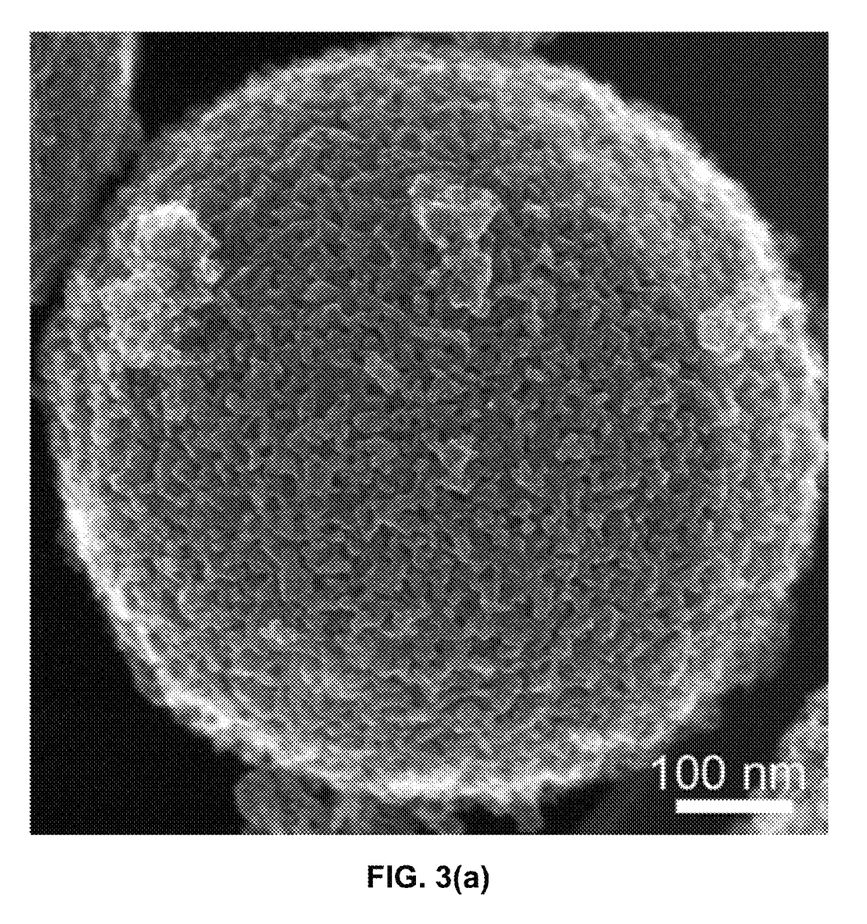
FIG. 3(a) depicts a SEM image of the prepared mesoporous $TiO_2$-B microspheres.
Figure 3B:
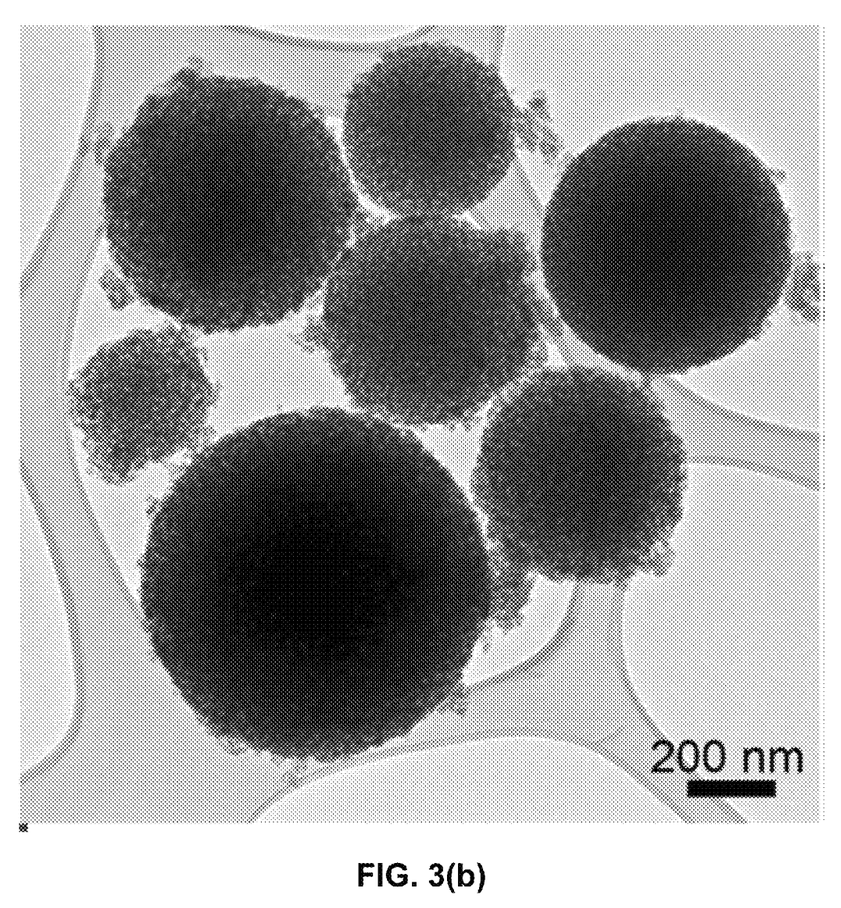
FIG. 3(b) depicts a TEM image of the prepared mesoporous $TiO_2$-B microspheres.

A scanning electron microscopy (SEM) image showed that the precursor titania-silica composite particles possessed spherical morphology and uniform particle size distribution. The result of laser diffraction analysis confirmed that the particle size of this material was distributed with a unimodal peak centered at 1 µm. Following silica etching and polymorphic phase transformation to the $TiO_2$-B structure, the material retained its overall spherical morphology when compared to the starting precursor material; however the structure became mesoporous having 10-15 nm pores substantially uniformly dispersed on the particle surface, as shown in FIG. 3(a). A TEM image indicated that the mesopores were substantially uniformly distributed across the bulk particles, rather than only on the surface, as shown in FIG. 3(b). A high resolution TEM (HRTEM) image also revealed that the structure of the mesoporous microspheres were comprised of many nanocrystallites with grain sizes ranging between 5-10 nm. Additionally, a corresponding fast Fourier transform (FFT) revealed the presented lattice planes of (001), (200), (110), (002) and (310) that exactly correspond to the monoclinic C2/m crystal structure of $TiO_2$-B. These results validate that the as-prepared material is a combination of $TiO_2$-B polymorph, mesoporous structure and spherical morphology.

Figure 4A:
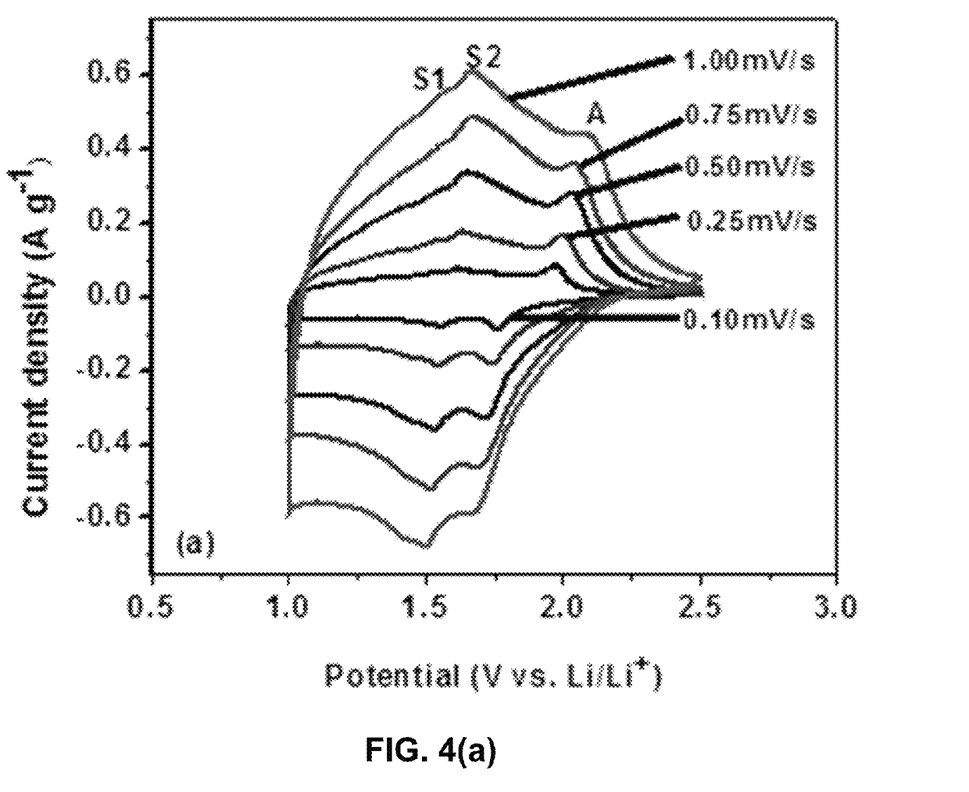
FIG. 4(a) depicts cyclic voltammograms of the prepared mesoporous $TiO_2$-B electrode at various scanning rates between 0.10 millivolts/second and 1.00 millivolts/second.

The electrochemical performance of this material was evaluated in lithium half-cells. FIG. 4(a) shows the cyclic voltammetry (CV) curves of $TiO_2$-B electrode at different scan rates of 0.10, 0.25, 0.50, 0.75 and 1.00 mV/s. There are three pairs of peaks in each CV. The observation of a pair of peaks located between 1.6 V and 2.2 V (denoted as A peak) is the typical behavior expected for solid-state diffusion of lithium intercalation in anatase. The two pairs of peaks located around 1.5 V and 1.6 V (denoted as S peak) are the characteristic pseudocapacitive behavior of lithium storage in $TiO_2$-B. Because the peak currents of the S peaks scale with the first power of scan rate and those of the A peaks scale with square root of the scan rate, the peak current increment of peak S is much higher than that of peak A with the increase of scan rate. This implied that the fast pseudocapacitive lithium transport dominates the lithium storage process at high currents. This phenomenon directly appears in the charge-discharge curves with different rates.

In the low-rate (C/10, 1 C is equal to 335 mA/g) charge-discharge curve, two distinct plateaus appear at 1.75 and 1.90 V, respectively, corresponding to the lithium insertion and de-insertion in the anatase phase. But the major capacities occur in the sloped regions of 1.75-1.0 V and 1.0-1.9 V. By analyzing the differential capacity increment curve of the charge branch, the pseudocapacitive contribution of $TiO_2$-B to the total lithium storage is 92% and the contribution of lithium intercalation in anatase is only 8%. This value of anatase content is lower than the result of XRD Rietveld refinement, possibly because of incomplete lithiation of anatase at this charge current. With the increase of charge-discharge rates, the plateaus gradually diminish. For a high-rate (10 C) charge-discharge curve, the plateau has almost disappeared. This means, at high current rate charge-discharge, mesoporous $TiO_2$-B material has the capability to maintain capacity by the fast pseudocapacitive process of lithium storage.

Figure 4B:
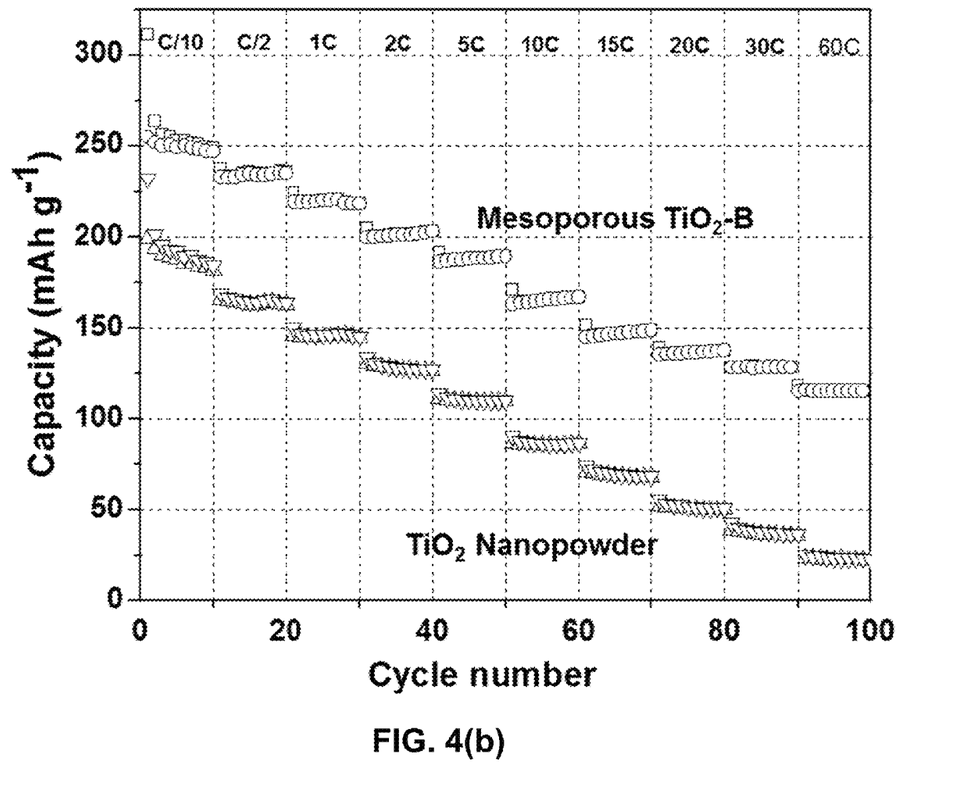
FIG. 4(b) depicts the rate performance (capacity) of mesoporous $TiO_2$-B and anatase nanoparticle electrodes at various current rates between C/10 and 60 C.

FIG. 4(b) shows the charge-discharge capacities of mesoporous $TiO_2$-B microspheres at different current rates. For comparison, a commercial $TiO_2$ (anatase) nanopowder which has a similar surface area (123 $m^2/g$) to the as-prepared mesoporous $TiO_2$-B material was also evaluated under the same conditions. The results show that in the first cycle at low rate (C/10), mesoporous $TiO_2$-B material can deliver a high discharge capacity of 311 mAh/g that is equal to 93% of the theoretical capacity (335 mAh/g) and a charge capacity of 256 mAh/g. Note that, the initial charge-discharge capacities of $TiO_2$ nanopowder are only 199 and 232 mAh/g, respectively.

The higher capacity of mesoporous spheres in comparison to nanoparticles at low current rate implies that the former has an advantage of building up a better ionic and electronic conduction net in the electrode layer. At high current rates, the difference of reversible capacity between the two materials is even more remarkable. Mesoporous $TiO_2$-B microspheres show superior rate performance with 165 mAh/g at 10 C, 130 mAh/g at 30 C and 115 mAh/g at 60 C, while $TiO_2$ nanopowders only maintain 70 mAh/g at 10 C, 36 mAh/g at 30 C and 23 mAh/g at 60 C. Apparently, at high rate charge-discharge, the capacity of nanopowder material only comes from double layer capacitance. However, mesoporous $TiO_2$-B microspherical material can maintain large capacity even at high rates because of its characteristic pseudocapacitive behavior.

Figure 4C:
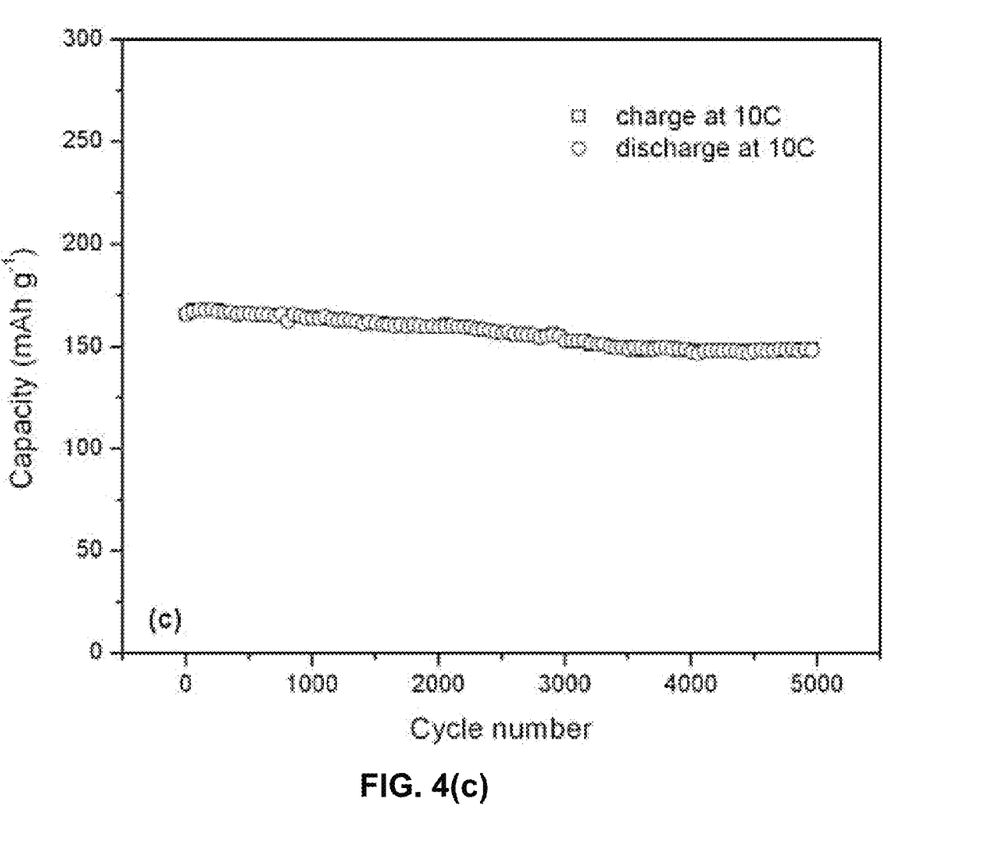
FIG. 4(c) depicts the cycling performance of the prepared mesoporous $TiO_2$-B electrode at a high current rate of 10 C.

In order to test the cyclability at high rates, a lithium cell made using mesoporous $TiO_2$-B spheres were run at 10 C (3350 mA/g) for 5000 cycles, after aging at C/10 for 5 cycles. FIG. 4(c) shows the capacity starts at 166 mAh/g and still maintains at 149 mAh/g after 5000 cycles, with a capacity loss of only 10%. XRD results show that the material structure remains in the $TiO_2$-B phase even after 5000 cycles. The superior cycling performance can be attributed to the structure stability of $TiO_2$-B polymorph and the good accommodation to volume/strain changes of mesoporous structure during lithium insertion-extraction.

Example 2

Material Synthesis

A titania precursor without silica was also prepared by a template assisted ultrasonic spray pyrolysis method. Titanium (IV) bis(ammonium lactato) dihydroxide solution (200 mL, 0.25 M, Aldrich) is added to a vessel under stirring. The solution is nebulized into small droplets by an ultrasonic atomizer (2.4 MHz, Sonaer Ultrasonics). Flowing nitrogen gas carries the droplets through a tube furnace at 500° C. at 1 atm at a flow rate of 3-4 L/min. The titania powders were collected for analysis.

Figure 5:
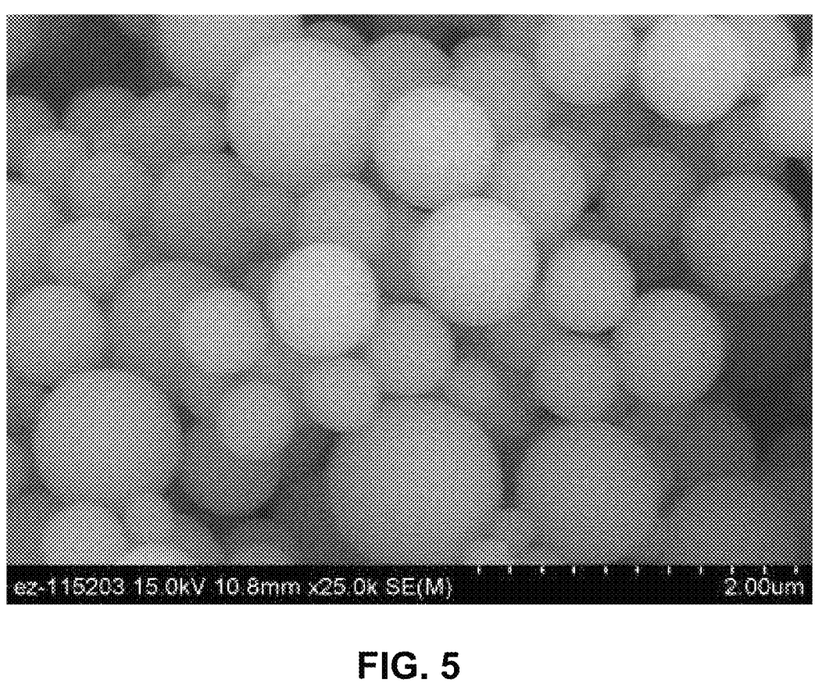
FIG. 5 depicts a SEM image of prepared mesoporous $TiO_2$ (anatase) microspheres using an aerosol process without the use of a silica template.

Similar to Example 1, the resulting powders were analyzed by SEM. FIG. 5 shows the result of the silica-free template formation using the aerosol process.

What is claimed is:
1. A mesoporous titanium dioxide microsphere electrode for a battery comprising:
  a mesoporous titanium dioxide microsphere composition comprising: (a) titanium dioxide microspheres that are at least 50 weight % $TiO_2$-B with an average diameter between 200 nanometers (nm) and 10 micrometers (µm); (b) mesopores on the surface and interior of the titanium dioxide microspheres, wherein the mesopores have an average diameter between 1 nm and 50 nm and the titanium dioxide microspheres have a surface area between 50 $m^2/g$ and 500 $m^2/g$.
2. The electrode of claim 1, wherein the titanium dioxide microspheres are comprised of nanograins with average diameters between 1 nm and 20 nm.

3. The electrode of claim 1, wherein the mesopores are substantially uniformly distributed throughout the surface and the interior of the titanium dioxide microspheres.

4. The electrode of claim 1, wherein the titanium dioxide microspheres are at least 80 weight % $TiO_2$-B, the average diameter of the titanium dioxide microspheres is between 1 μm and 2 μm, the average diameter of the mesopores is between 10 nm and 15 nm, and the titanium dioxide microspheres are comprised of nanograins with average diameters between 5 nm and 10 nm.

5. The electrode of claim 1, wherein the mesoporous titanium dioxide microsphere composition is used as an anode in a lithium-ion battery further comprising a cathode and electrolyte, wherein the battery has at least one of the following performance characteristics:
   (a) at least a 25% higher capacity at a rate of C/10, at least a 40% higher capacity at a rate of 1 C, at least a 100% higher capacity at a rate of 10 C, or at least a 400% higher capacity at a rate of 60 C, when compared with a lithium-ion battery having a $TiO_2$ anatase anode composition;
   (b) a capacity at least 250 mAh/g at a rate of C/10, a capacity of at least 200 mAh/g at a rate of 1 C, a capacity of at least 150 mAh/g at a rate of 10 C, or a capacity of at least 100 mAh/g at a rate of 60 C;
   (c) an ability to charge from 0% to 50% of the full range capacity in 6 minutes, or an ability to charge from 0% to 33% of the full range capacity in 1 minute; and
   (d) a functional discharge capacity of at least 50%, 60%, 70%, 80%, or 90% of the initial discharge capacity after 5000 cycles.

6. The electrode of claim 1, wherein the titanium dioxide microspheres are derived from titania-silica composite particles having spherical morphology and uniform particle size distribution, the titanium dioxide microspheres retaining the spherical morphology of the titania-silica composite particles.

7. The electrode of claim 1, wherein the titanium dioxide microspheres have a surface area between 100 $m^2$/g and 300 $m^2$/g.

8. The electrode of claim 4, the titanium dioxide microspheres have a surface area between 100 $m^2$/g and 200 $m^2$/g.

9. A battery comprising:
   an anode, the anode being the mesoporous titanium dioxide microsphere electrode of claim 1;
   a cathode; and
   an electrolyte capable of supporting reversible deposition and stripping of metal at the anode, and reversible intercalation and deintercalation of the metal at the cathode.

10. The battery of claim 9, wherein the mesopores are substantially uniformly distributed throughout the surface and the interior of the titanium dioxide microspheres.

11. The battery of claim 9, wherein the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium.

12. The battery of claim 9, wherein the battery is a lithium-ion battery.

13. The battery of claim 12, wherein the titanium dioxide microspheres are at least 80 weight % $TiO_2$-B, the average diameter of the titanium dioxide microspheres is between 1 μm and 2 μm, the average diameter of the mesopores is between 10 nm and 15 nm, and the titanium dioxide microspheres are comprised of nanograins with average diameters between 5 nm and 10 nm.

14. The battery of claim 12 having at least a 25% higher capacity at a rate of C/10, at least a 40% higher capacity at a rate of 1 C, at least a 100% higher capacity at a rate of 10 C, or at least a 400% higher capacity at a rate of 60 C, when compared with a lithium-ion battery having a $TiO_2$ anatase anode composition.

15. The battery of claim 12 having a capacity of at least 250 mAh/g at a rate of C/10, a capacity of at least 200 mAh/g at a rate of 1 C, a capacity of at least 150 mAh/g at a rate of 10 C, or a capacity of at least 100 mAh/g at a rate of 60 C.

16. The battery of claim 12 having an ability to charge from 0% to 50% of the full range capacity in 6 minutes, or an ability to charge from 0% to 33% of the full range capacity in 1 minute.

17. The battery of claim 12 having a functional discharge capacity of at least 90% of the initial discharge capacity after 5000 cycles.

18. The battery of claim 9, wherein the battery is used in a grid storage application, vehicle battery application, military application, portable electronic device application, medical device application, or standard cell size battery application.

19. A method of making the mesoporous titanium dioxide microsphere electrode of claim 1 comprising:
   providing a titania-silica composite powder;
   refluxing the composite powder in a basic solution to form an etched powder;
   washing the etched powder with an acid to form a hydrated titanium oxide; and
   heat-treating the hydrated titanium oxide to form the mesoporous titanium dioxide microsphere composition.

20. The method of claim 19, wherein the titania-silica composite powder is formed by a process selected from the group consisting of:
   aerosol pyrolysis, spray drying, freeze drying, combustion chemical vapor deposition, and plasma processing.

21. The method of claim 19, wherein the titania-silica composite powder is formed by aerosol pyrolysis.

22. The method of claim 19, wherein the titania-silica composite powder is formed by:
   providing colloidal silica;
   providing a titania solution;
   mixing the silica and the titania solution to form a mixed solution;
   nebulizing the mixed solution to form a nebulized mixed solution; and
   heating the nebulized mixed solution at an elevated temperature to form the titania-silica composite powder.

23. A method of making the mesoporous titanium dioxide microsphere electrode of claim 1 comprising:
   providing a titania precursor, wherein the titania precursor contains less than 0.1 weight % of a silica precursor; and
   forming the mesoporous titanium dioxide microsphere composition by treating the titania precursor by a process selected from the group consisting of: aerosol pyrolysis, spray drying, freeze drying, combustion chemical vapor deposition, and plasma processing.

24. The method of claim 23, wherein the mesoporous titanium dioxide microsphere composition is formed by aerosol pyrolysis.

25. The method of claim 23, wherein the titania precursor is a titanium precursor selected from the group consisting of:

titanium nitrate, titanium chloride, titanium ethoxide, titanium alkoxide, titanium acetylacetonates, and combinations thereof.

* * * * *